(12) United States Patent
Duda et al.

(10) Patent No.: US 9,093,825 B2
(45) Date of Patent: Jul. 28, 2015

(54) PANELBOARD MOVEABLE INSULATOR

(71) Applicant: General Electric Company, Schenectady, NY (US)

(72) Inventors: Mariusz Duda, Windsor Locks, CT (US); William Maurer, Southington, CT (US); Dean Robarge, Southington, CT (US); Michael Wood, Southington, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 301 days.

(21) Appl. No.: 13/711,882

(22) Filed: Dec. 12, 2012

(65) Prior Publication Data

US 2014/0160640 A1    Jun. 12, 2014

(51) Int. Cl.
*H02B 1/04* (2006.01)
*H02B 1/06* (2006.01)
*H02B 13/025* (2006.01)

(52) U.S. Cl.
CPC .. *H02B 1/04* (2013.01); *H02B 1/06* (2013.01); *H02B 13/025* (2013.01)

(58) Field of Classification Search
CPC ............... H02B 1/04; H02B 7/00; H01H 9/02
USPC ......... 361/605, 609, 617, 611, 637, 645, 634, 361/622, 626, 652; 200/50.27, 304, 306, 200/333; 218/41, 149, 157; 335/132, 201, 335/202
See application file for complete search history.

(56) References Cited

U.S. PATENT DOCUMENTS

| | | | | |
|---|---|---|---|---|
| 2,174,669 A | * | 10/1939 | Sachs | 361/673 |
| 2,351,942 A | * | 6/1944 | Dyer et al. | 361/650 |
| 2,717,339 A | * | 9/1955 | Brown | 361/634 |
| 3,210,608 A | | 10/1965 | Appleton | |
| 3,258,569 A | | 6/1966 | Frink | |
| 3,842,381 A | | 10/1974 | Bernatt et al. | |
| 4,019,005 A | * | 4/1977 | Michetti | 218/149 |
| 4,945,450 A | * | 7/1990 | Sabatella et al. | 361/624 |
| 4,965,544 A | * | 10/1990 | Kelaita et al. | 335/202 |
| 5,150,091 A | * | 9/1992 | Hart et al. | 335/202 |
| 5,241,289 A | * | 8/1993 | Markowski et al. | 335/201 |
| 5,304,761 A | * | 4/1994 | Rosen et al. | 218/157 |
| 5,457,296 A | * | 10/1995 | Neill et al. | 200/306 |
| 5,574,624 A | | 11/1996 | Rennie et al. | |
| 5,710,402 A | | 1/1998 | Karnbach et al. | |
| 6,215,654 B1 | | 4/2001 | Wilkie, II et al. | |
| 6,222,147 B1 | * | 4/2001 | Doughty et al. | 218/157 |
| 6,410,844 B1 | | 6/2002 | Bruner et al. | |

(Continued)

*Primary Examiner* — Michail V Datskovskiy
(74) *Attorney, Agent, or Firm* — GE Global Patent Operation; Stephen G. Midgley

(57) ABSTRACT

An electrical switching apparatus for housing a pair of opposing circuit breakers each circuit breaker of the pair of opposing circuit breakers having an opposing end face including an exhaust vent disposed thereon is disclosed. The electrical switching apparatus includes a panelboard to operatively support the pair of opposing circuit breakers to define a gap therebetween, and an insulative barrier to be operatively disposed in the gap. The insulative barrier includes a first cantilever wall member arrangeable to define a first plenum region having a first cross sectional area, and a second plenum region having a second cross sectional area. The insulative barrier is operative to deflect in a first direction to thereby increase one of the first and second cross sectional areas in response to a venting of ionized gases from one circuit breaker of the pair of circuit breakers.

20 Claims, 8 Drawing Sheets

(56) References Cited

U.S. PATENT DOCUMENTS

| | | |
|---|---|---|
| 6,417,443 B1 | 7/2002 | Smith |
| 6,762,389 B1 * | 7/2004 | Crooks et al. .................. 218/157 |
| 6,924,721 B2 * | 8/2005 | Afshari et al. ................. 335/202 |
| 7,843,682 B2 | 11/2010 | Leinen et al. |
| 8,519,287 B2 * | 8/2013 | Raabe et al. .................. 200/306 |
| 2005/0012578 A1 | 1/2005 | Afshari et al. |
| 2007/0097604 A1 | 5/2007 | Bruski et al. |
| 2009/0185333 A1 | 7/2009 | Coomer et al. |
| 2012/0120558 A1 * | 5/2012 | Raabe et al. .................. 361/619 |

* cited by examiner

PANELBOARD MOVEABLE INSULATOR

BACKGROUND OF THE INVENTION

The embodiments described herein relate generally to power equipment protection devices and, more particularly, to apparatus employing an moveable insulator for use in diffusing ionized exhaust gases and pressure away from a location of arc generation.

Conventional panelboards provide an electrical distribution apparatus for mounting a plurality of circuit breakers to control electrical distribution from a main to one or more branch circuits. Such panelboards typically comprise a wall-mounted enclosure supporting conductive bus bars and electrical switching apparatus (e.g., without limitation, switching devices and circuit interrupters such as circuit breakers, contactors, motor starters, motor controllers and other load controllers) electrically coupled to the bus bars.

Circuit breakers are often arranged in conventional panelboard assemblies in adjacent pairs and are connected in an end-opposing, "double-branch" arrangement, to bus bars carrying current of the same electrical phase. Circuit breakers typically have a molded plastic housing enclosing at least one pair of separable contacts. When the separable contacts are opened, under overload, short circuit or fault conditions, an arc is created which is accompanied by the generation of ionized gases. The ionized gas temperatures can reach or exceed 20,000° C., which can vaporize the conductors and adjacent equipment. Moreover, an arc flash can release significant energy in the form of heat, intense light, pressure waves, and/or sound waves, sufficient to damage the conductors and adjacent equipment.

Such ionized gases are conventionally discharged through exhaust vent openings arranged in the circuit breaker housing and, when discharged from one circuit breaker within the double-branch arrangement, could transfer to the other adjacent circuit breaker, or to the bus bar conductors, resulting in a phase-to-phase electrical fault. The ionized gases could also cause a phase-to-ground failure with the metallic panelboard enclosure within which the circuit breaker is mounted.

Known prior art panelboard assemblies employ fixed, relatively rigid, stationary barriers and a non-expandible plenum between the opposing poles of a pair of double-branch mounted, spaced-apart circuit breakers in a multi-phase power system to prevent a phase-to-phase electrical fault caused by ionized exhaust gases discharged from one circuit breaker phase from reaching or contacting other phase conductors in the power system.

Although some prior art panelboards have included stationary barriers to protect the phase conductors from the discharged ionized gases, these barriers typically aim to prevent the flow of the exhaust gases past the barrier and are not adjustable or moveable to operatively change the proportion of space on each side of the barrier in response to ionized exhaust gases vented during an arcing event. Additionally, other prior art barriers use more complex multiple piece barrier arrangements, which increase cost. There is a need therefore, for an improved simple, robust, and inexpensive, insulative barrier having minimal parts, installable in a panelboard, and operative to move to advantageously increase the volume of a plenum to contain the discharged ionized gases.

Accordingly, there is room for improvement in circuit protective systems having a moveable insulative barrier for electrical switching apparatus and panelboard assemblies.

BRIEF DESCRIPTION

In one aspect, an electrical switching apparatus for housing a pair of opposing circuit breakers, each circuit breaker of the pair of opposing circuit breakers having an opposing end face including an exhaust vent disposed thereon, is disclosed. The switching apparatus includes a panelboard to operatively support the pair of opposing circuit breakers to define a gap therebetween, and an insulative barrier configured to be operatively disposed in the gap, having a first cantilever wall member to define a first plenum region having a first cross sectional area, and a second plenum region having a second cross sectional area. The insulative barrier is operative to deflect in a first direction to thereby increase one of the first and second cross sectional areas in response to a venting of ionized gases from one circuit breaker of the pair of circuit breakers. In certain embodiments, the insulative barrier comprises a second cantilever wall member cooperative with the first cantilever wall member to define the first plenum region and second plenum regions.

In another aspect, an electrical protection system including a pair of circuit breakers is disclosed. The electrical protection system includes an enclosure for housing the pair of circuit breakers, the enclosure being configured to operatively support the pair of circuit breakers to define a gap therebetween. An insulative barrier is configured to be operatively disposed in the gap, comprising a first cantilever wall member to define a first plenum region having a first cross sectional area, and a second plenum region having a second cross sectional area. The insulative barrier is operative to deflect in a first direction to thereby increase one of the first and second cross sectional areas in response to a venting of ionized gases from one circuit breaker of the pair of circuit breakers. In certain embodiments, the insulative barrier comprises a second cantilever wall member cooperative with the first cantilever wall member to define the first plenum region and second plenum regions.

DETAILED DESCRIPTION OF THE INVENTION

Exemplary embodiments of circuit protection systems and apparatus are described herein. These embodiments enhance the quenching and controlling of gases, heat, and pressure that exhaust from a circuit breaker after an arc is generated. These embodiments quench and control the flow of exhaust gases, heat, and pressure out of circuit breaker contained within the circuit protection system. Quenching and controlling the exhaust gases protects the circuit protection system and any other electrical equipment that is positioned within the equipment enclosure from the flow of exhaust gases, heat, and pressure.

While various embodiments are described herein with reference to an electrical panelboard assembly having one or more pairs of opposing conventional three-pole circuit breakers, other contemplated embodiments are not so limited and may also embody other electrical power devices and systems such as, for example, load centers or similar power distribution apparatus having electrical switching devices such as, for example, single or multi-pole circuit switching devices, such as contactors, motor starters, motor controllers, and other load controllers.

As employed herein, the term "ionized" means completely or partially converted into ions and being electrically conductive such as, for example, ionized gases generated in response to an electrical fault.

As employed herein, the term "double-branch" refers to a configuration of electrical switching apparatus within a panelboard, such as a pair of spaced-apart circuit breakers each having a plurality of poles, with each of the poles of one of the spaced-apart circuit breakers having a corresponding opposing one of the poles on the other one of the spaced-apart circuit breakers, such that each pair of corresponding opposing poles is electrically connected to an elongated bus bar carrying current of the same electrical phase.

Figure 1:
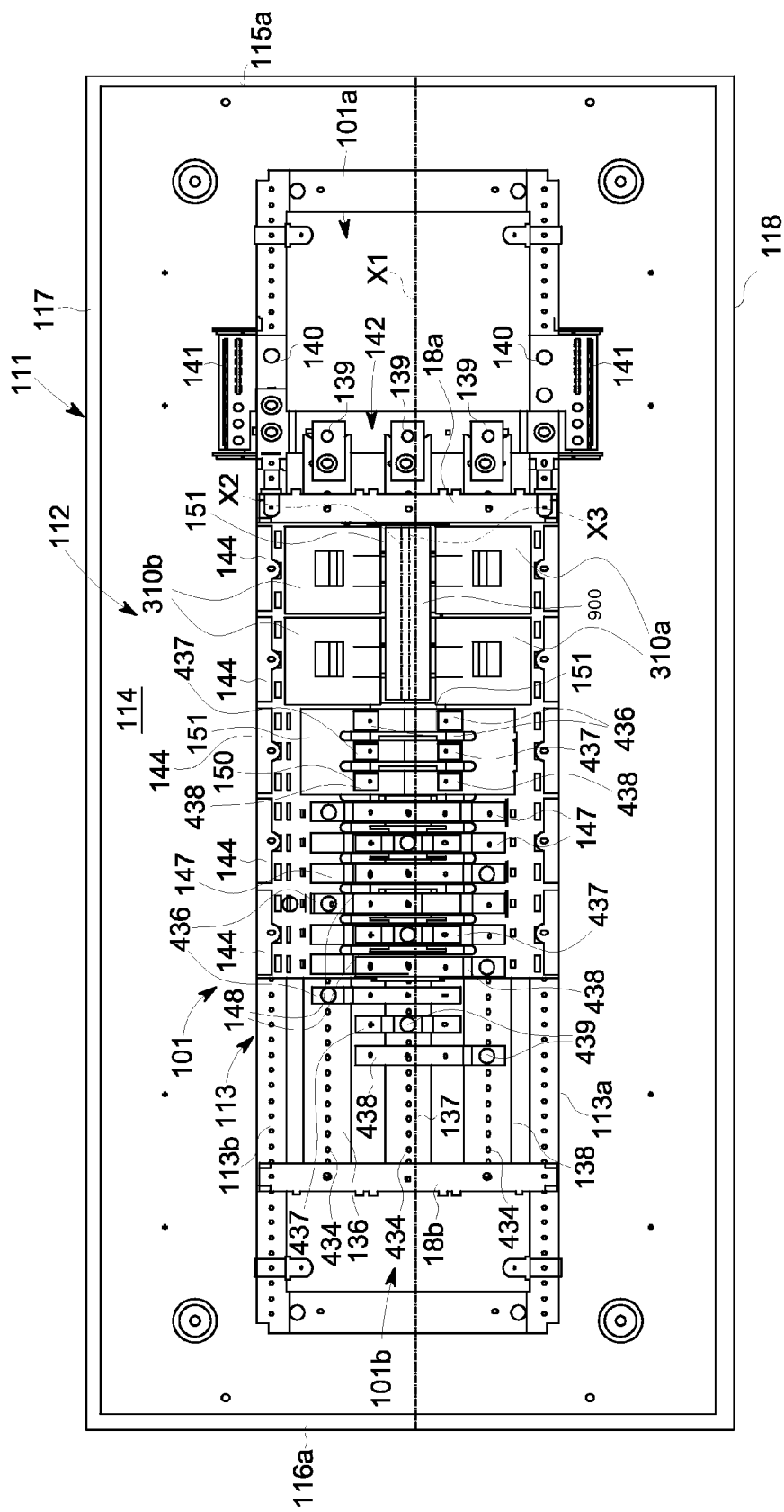
FIG. 1 is a front view of an exemplary circuit protection system according to an embodiment, with the cover omitted for clarity.
Figure 2:
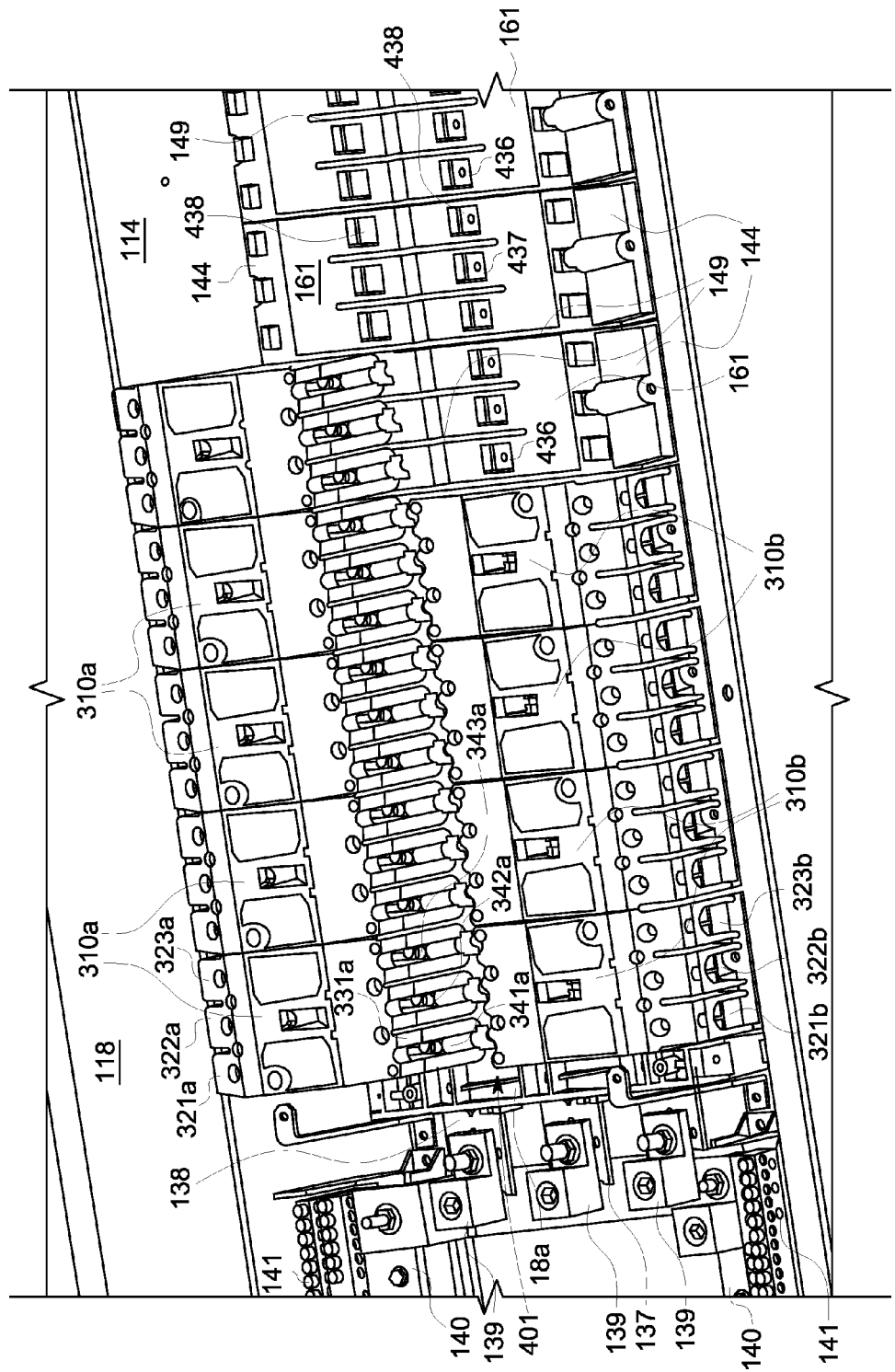
FIG. 2 is a perspective view of a portion of a circuit protection system according to an embodiment, the insulative barrier and various parts removed for clarity.
Figure 3:
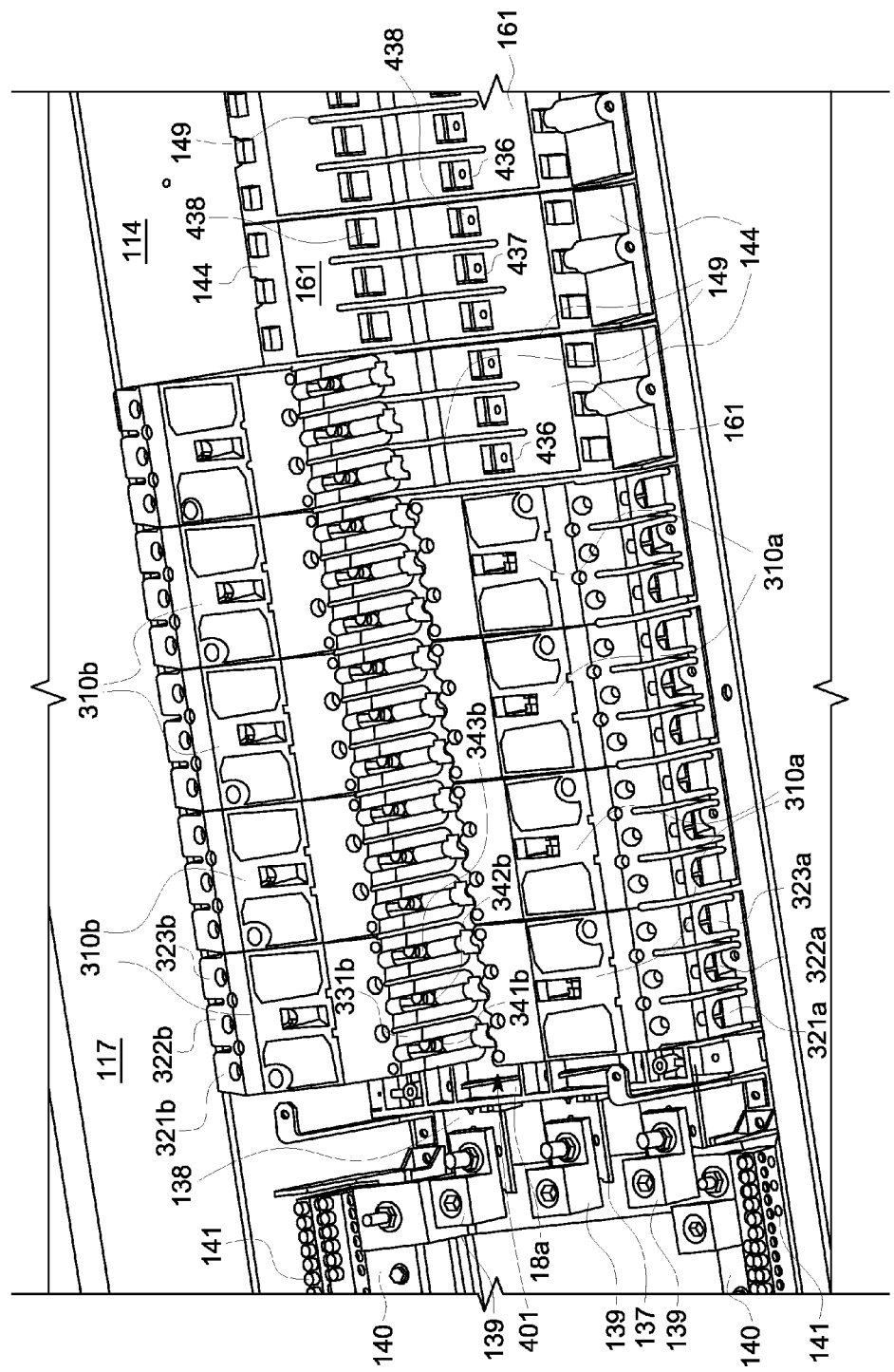
FIG. 3 is a perspective view of a portion of a circuit protection system according to an alternative embodiment, the insulative barrier and various parts removed for clarity.

FIG. 1 illustrates a moveable or deflectable insulative barrier 900 for use with a distribution device such as an electrical panelboard assembly 101. FIG. 1 depicts an embodiment having two pairs of circuit breakers 310A, 310B, installed in the panelboard 101, with various redundant parts of the panelboard assembly 101 omitted for clarity.

In an embodiment, the panelboard assembly 101 includes a support frame 113, main or phase bus conductors 136, 137, 138 and a plurality of corresponding branch strap conductors 436, 437, or 438, and one or more circuit breaker mounting bases 144. In various embodiments, the panelboard assembly 101 also includes a cabinet or enclosure 111 defining an enclosure interior portion 112 therein. In an embodiment, the panelboard assembly 101 includes a first end 101a and a second opposing end 101b, defining a first longitudinal axis X1 extending therebetween.

In an embodiment, the support frame 113 includes a pair of elongated spaced apart side rails 113a and a pair of spaced apart end rails 113b rigidly coupled to the side rails 113a. In an embodiment, the support frame 113 is secured in engagement with a back wall 114 of the enclosure 111.

In an embodiment, the enclosure 111 includes a first end 115 and an opposing second end 116. In various embodiments, the enclosure 111 includes the back wall 114 and two opposing end walls 115a, 116a disposed at the enclosure 111 first end 115 and second end 116, respectively, and arranged generally orthogonal to the back wall 114. Enclosure 111 may also include two opposing spaced apart side walls 117, 118 extending between end walls 115a, 116a and arranged generally orthogonal to the back wall 114. Enclosure 111 may further include a panelboard cover 119 disposed spaced from and generally parallel to the back wall 114. In some embodiments, the cover may additionally comprise a deadfront portion, 119a arranged to operatively prevent inadvertent access to electrically live conductors within the enclosure 111. In other embodiments, a removable or openable non-deadfront portion 119b of the panelboard cover 119 is provided to allow user access to other interior parts. Respective openings in the deadfront 119a are arranged to allow the circuit breaker operating handles 302 to extend therethrough. In some embodiments, an openable door (not shown) is arranged to cover the handles of respective circuit breakers in a first closed position, and to provide access thereto in a second open position.

In an embodiment, the main or phase bus conductors 136, 137, 138 are arranged as plurality of spaced apart, substantially parallel, elongate, generally flat bus bars. For example, first, second and third elongated bus bars 136, 137, 138, are disposed in the enclosure interior portion 112, coupled to, and electrically isolated from, the support frame 113. Each phase conductor 136, 137, 138 is coupled to a respective lug 139 or other suitable connector for receiving incoming power, such as from an electrical cable.

At least one respective branch strap conductor 436, 437, or 438 is operatively coupled to corresponding main bus or phase conductor 136, 137, 138. In an embodiment, the main bus 136, 137, 138 and branch strap conductors 436, 437, 438 may be rigidly coupled via a fastener 439 such as a bolt or rivet. For example, each main bus or phase conductor 136, 137, 138 may be provided with a plurality of longitudinally spaced apertures 434 defined therethrough, and sized to receive the fastener 439. Likewise, the branch strap conductors 436, 437, and 438 may also include an aperture defined therethrough and sized to receive the fastener 439.

A neutral assembly 140 may also be included as part of the panelboard assembly 101. In an embodiment, the neutral assembly 140 includes spaced apart parallel conductive bars 141 having a plurality of suitable lugs and screws. The neutral assembly 140 is secured to support frame 113. In an embodiment, the neutral assembly is secured to the support frame 113 along opposite longitudinal margins thereof, and a conductive member 142 extends between and electrically couples portions of the neutral assembly 140.

In various embodiments, the panelboard assembly 101 also includes one or more insulative braces 18, such as top brace 18a and bottom brace 18b to prevent movement of the phase bus bars 136, 137, 138 during a fault condition. In an embodiment, the insulative braces 18 are formed of an insulative thermoplastic material such as Noryl, and rigidly secured to and bridge phase bus bars 136, 137, 138. The braces 18 may also be rigidly secured to the side rails 113a, 113b.

In an embodiment, one or more circuit breaker mounting bases 144 are configured to align, support, and position a first circuit breaker 310A and a second circuit breaker 310B as a corresponding pair of circuit breakers 310A, 310B to be operatively coupled to the phase bus conductors 136, 137, 138. The mounting base 144 may be formed of an insulative thermoplastic material, such as Noryl, and rigidly secured to and bridge the side rails 113a.

In an embodiment, the circuit breaker mounting base 144 includes a plurality of upstanding, elongated, parallel divider walls 149 integrally formed therewith. The divider walls 149 define branch strap compartments 147 spaced along the longitudinal axis X1 of the panelboard assembly 101. In an embodiment, a respective one of the branch strap conductors 436, 437, or 438 is disposed in each branch strap compartment 147 and arranged to be electrically coupled to a respective pole of at least one circuit breaker of the corresponding pair of circuit breakers 310A, 310B. In an embodiment, to enable the branch strap conductors 436, 437, or 438 to electrically couple to both a respective main bus conductor 136, 137, 138 and the corresponding circuit breaker 310A, 310B pole, each branch strap compartment 147 includes a respective mounting base branch strap aperture 148 defined therethrough, sized and disposed to enable a respective one of the respective branch strap connectors 436, 437, or 438 to be operatively disposed therethough. The divider walls 149 also separate adjacent circuit breaker 310A, 310B poles and thereby prevent inadvertent bridging between branch strap conductors 436, 437, or 438 of different electric potential.

In some embodiments, to insulate the portions of the branch strap conductors 436, 437, 438 disposed in the branch strap compartments 147 not intended to be operatively coupled to a circuit breaker 310A, 310B pole, a branch strap cover 161 is further operatively disposed between the branch strap conductors and at least one of the circuit breakers 310A, 310B. A respective branch strap cover aperture 150 is defined therethrough, and sized and disposed to enable a portion of a respective one of the respective branch strap connectors 436, 437, or 438 to be operatively disposed therethough and thereby readily coupleable to a respective circuit breaker 310A, 310B pole. In an embodiment, the branch strap cover 161 is formed from a sheet of insulative material such as Noryl.

In an embodiment, the circuit breaker mounting base 144 is disposed and arranged to operatively support at least a pair of conventional circuit breakers 310A, 310B in a spaced apart orientation in the enclosure interior portion 112. When operatively supported on the insulative base 144, the circuit breakers 310A, 310B are arranged to define a gap 401 therebetween, the gap 401 having a second longitudinal axis X2 extending generally parallel to the first longitudinal axis X1.

In the embodiments illustrated in FIGS. 1-4, the circuit breakers 310A, 310B are conventional three-pole circuit breakers, each having a plurality of poles, for example, first, second and third poles 321A, 322A, 323A of three-pole circuit breaker 310A, and first, second and third poles 321B, 322B, 323B of three-pole circuit breaker 310B. As shown, each one of the poles 321A, 322A, 323A of circuit breaker 310A has a corresponding opposing one of the poles 321B, 322B, 323B on the opposing circuit breaker 310B. The first circuit breaker 310A of the pair of circuit breakers 310A, 310B includes a housing 330A having a first end face 331A defining at least a first exhaust opening such as a vent 341A thereon. The second circuit breaker 310B of the pair of circuit breakers 310A, 310B includes a housing 330B having a second end face 331B defining at least a second exhaust opening such as a vent 341B thereon.

The vent openings 341A, 341B, are disposed and arranged to discharge ionized gases, depicted as arrow, 65 from within the circuit breakers 310A, 310B, such as in the event of an electrical fault. In the embodiment illustrated in FIG. X, the first end face 331A defines a plurality of exhaust openings such as vents 341A, 342A, 343A thereon for the corresponding poles 321A, 322A, 323A thereof; and the second end face 331B defines a plurality of exhaust openings such as vents 341B, 342B, 343B thereon for the corresponding poles 321B, 322B, 323B thereof. The vents 341A, 342A, 343A, 341B, 342B, 343B are disposed and arranged to discharge ionized gases 65 from within the circuit breakers 310A, 310B.

The insulative barrier 900 is sized and arranged to be operatively disposed in the gap 401 and to define a first plenum region 931 having a first cross-sectional area therein, and having a third longitudinal axis X3. First plenum region 931 is disposed proximal to the first circuit breaker 310A of the pair of circuit breakers 310A, 310B and arranged in flow communication with the first circuit breaker 310A exhaust vents 341A, 342A, 343A. Additionally, the insulative barrier 900 is further sized and arranged to be operatively disposed in the gap 401 to define a second plenum region 932 having a second cross-sectional area therein, proximal to the second circuit breaker 310B of the pair of circuit breakers 310A, 310B, and having a fourth longitudinal axis X4 therein. The second plenum region 932 is disposed proximal to the second circuit breaker 310B of the pair of circuit breakers 310A, 310B and arranged in flow communication with the second circuit breaker 310A exhaust vents 341B, 342B, 343B. In an embodiment, the third and fourth longitudinal axes X3, X4 extend generally parallel to the first longitudinal axis X1. For example, in an embodiment, the third and fourth longitudinal axes X3, X4 of first and second plenum regions 931, 932 are arranged to extend between the first end 101a and the opposing second end 101b of the panelboard assembly 101.

Moreover, the insulative barrier 900 is disposed to be operatively coupled in flow communication with the circuit breaker 310A 310B exhaust vents 341A, 342A, 343A, 341B, 342B, 343B. For example, the insulative barrier 900 may be disposed proximal to the first and second end faces 331A, 331B of the first and second circuit breakers 310A 310B.

Figure 4:
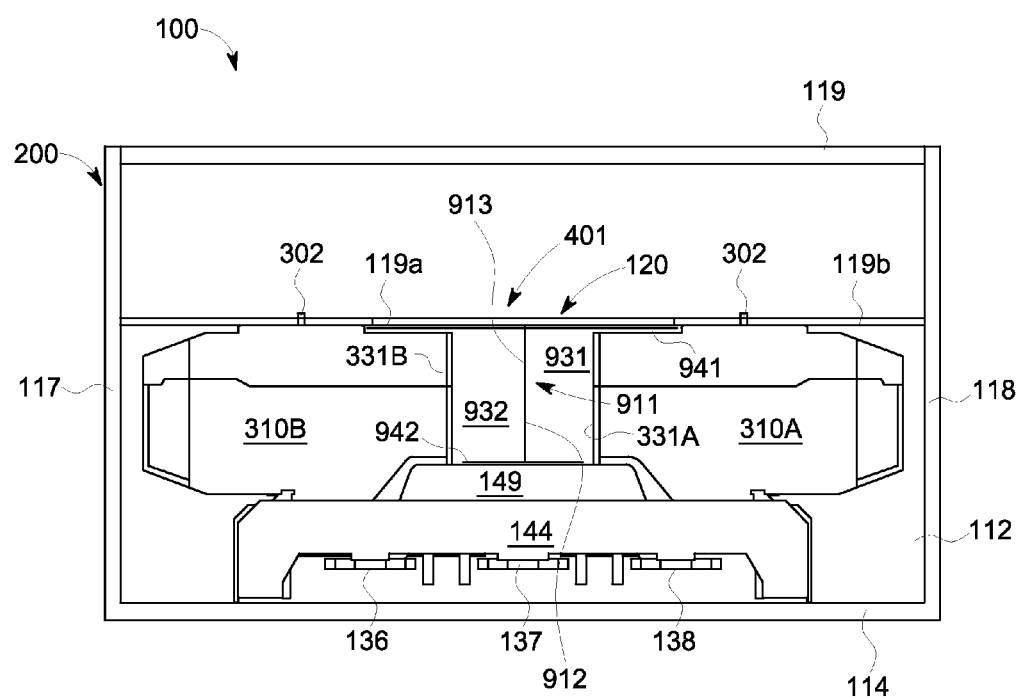
FIG. 4 is an end view of an exemplary circuit protection system according to an embodiment.
Figure 8:
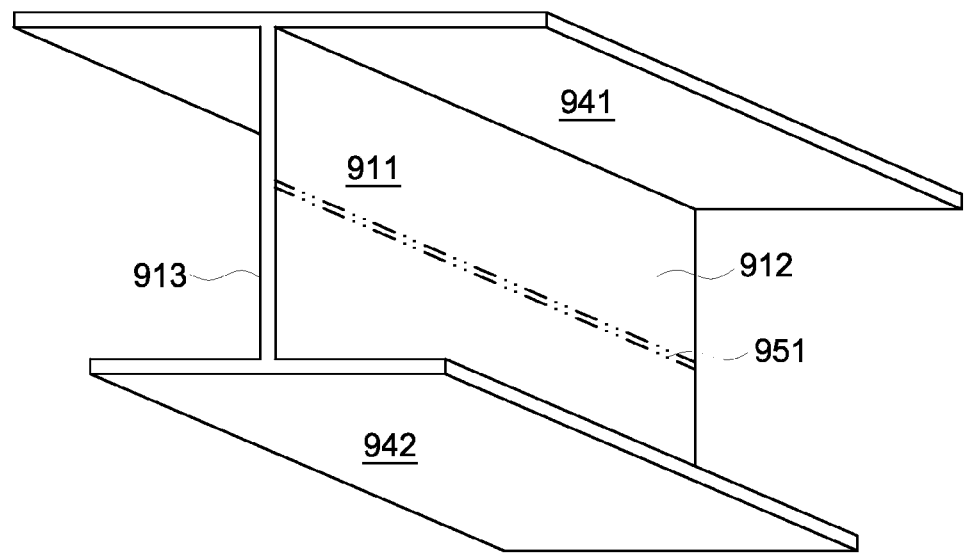
FIG. 8 is an perspective view of an embodiment of the insulative barrier that may be used with the embodiment of FIG. 4.
Figure 9:
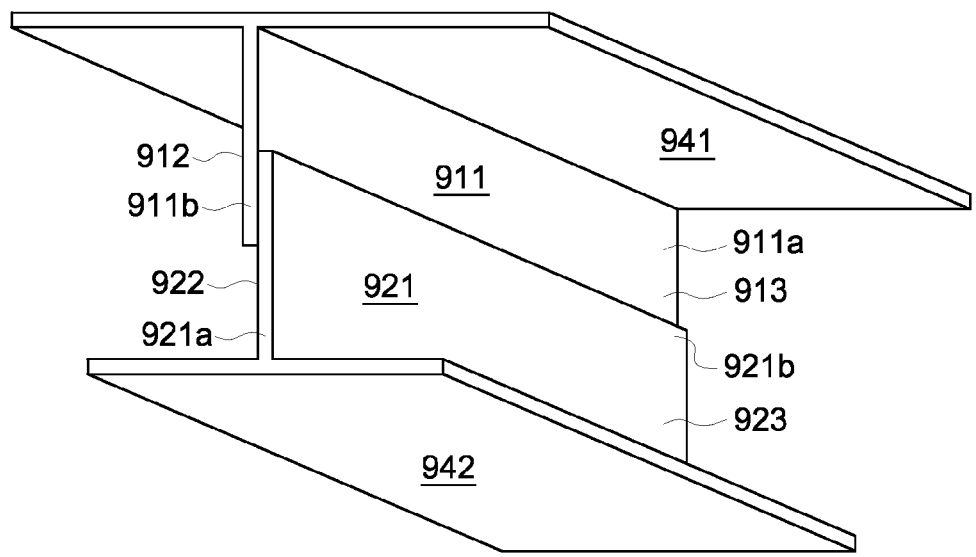
FIG. 9 is an perspective view of an embodiment of the insulative barrier that may be used with the embodiment of FIG. 6.

In an exemplary embodiment, as shown in FIGS. 4, 8, and 9, the insulative barrier 900 may be formed having a first cantilever wall member 911 defining first and second opposing wall face portions 912, 913 having a first basal end 911a and a first distal end 911b.

Figure 7:
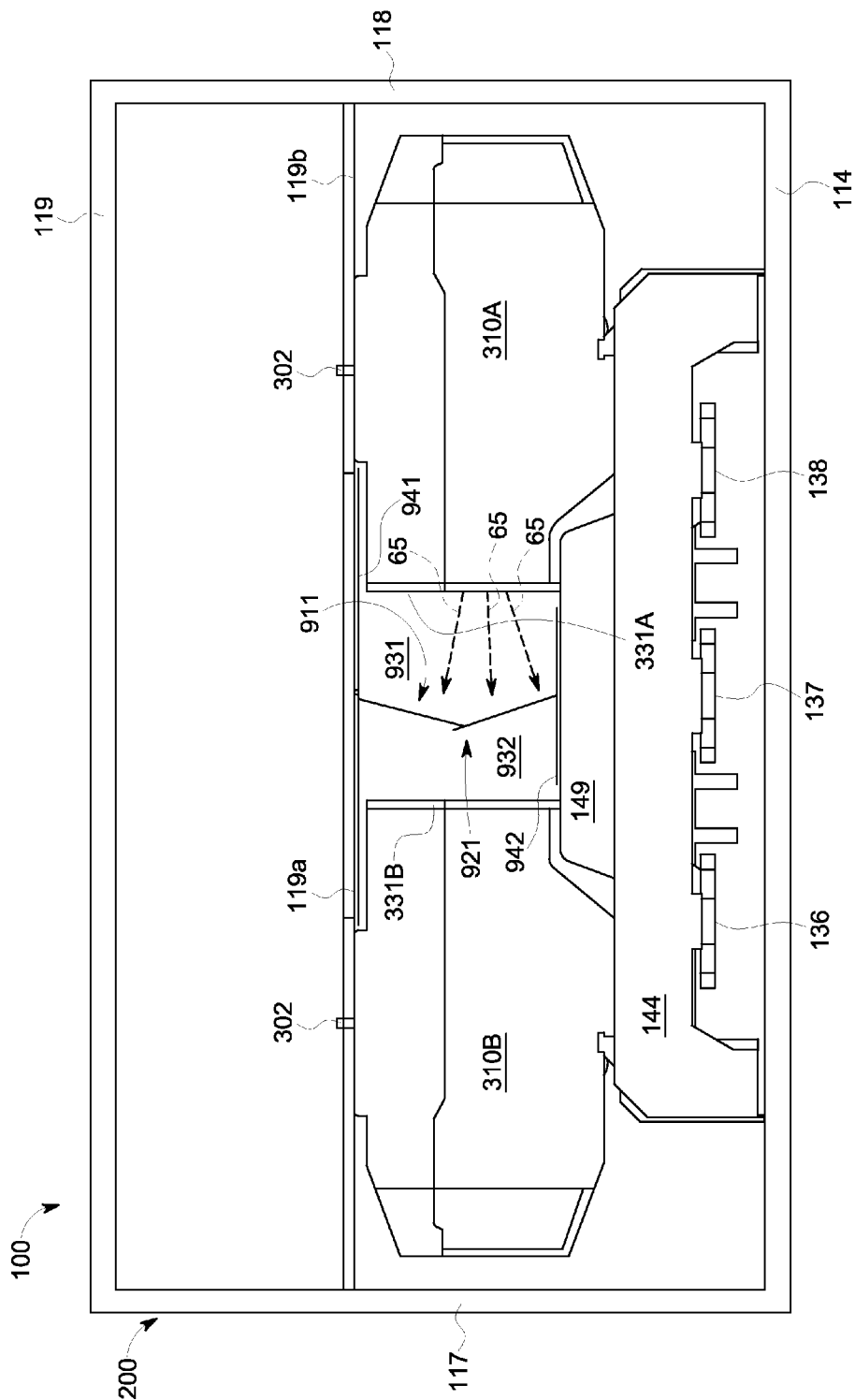
FIG. 7 is an end view the embodiment of FIG. 6 in an operative condition.

For example in an embodiment, as illustrated in FIG. 4, the first cantilever wall member 911 first wall face portion 912 is arranged opposing first circuit breaker end face 331A, and in operative flow communication with corresponding exhaust vents 341A, 342A, 342A. Likewise, the first cantilever wall member 911 second wall face portion 913 is arranged opposing second circuit breaker end face 331B, and in operative flow communication with corresponding exhaust vents 341B, 342B, 342B. The first cantilever wall member 911 is further configured to be moveable in response to an increase in pressure in the corresponding first or second plenum portions 931, 932 resulting from the presence of ionized gases 65 when vented from at least one circuit breaker of the pair of circuit breakers 310A, 310B. Additionally, the first cantilever wall member 911 is configured to deflect in a direction away from the ionized gases 65, when vented from at least one circuit breakers 310A, 3210B of the pair of circuit breakers 310A, 310B, resulting in an increase in the cross-sectional area of the corresponding first or second plenum portions 931, 932. In an embodiment, and as depicted in FIGS. 5 and 7, the increase in the cross-sectional area of one the corresponding first or second plenum portions 931, 932 results in a decrease of the other of the first or second plenum portions 931, 932.

Figure 5:
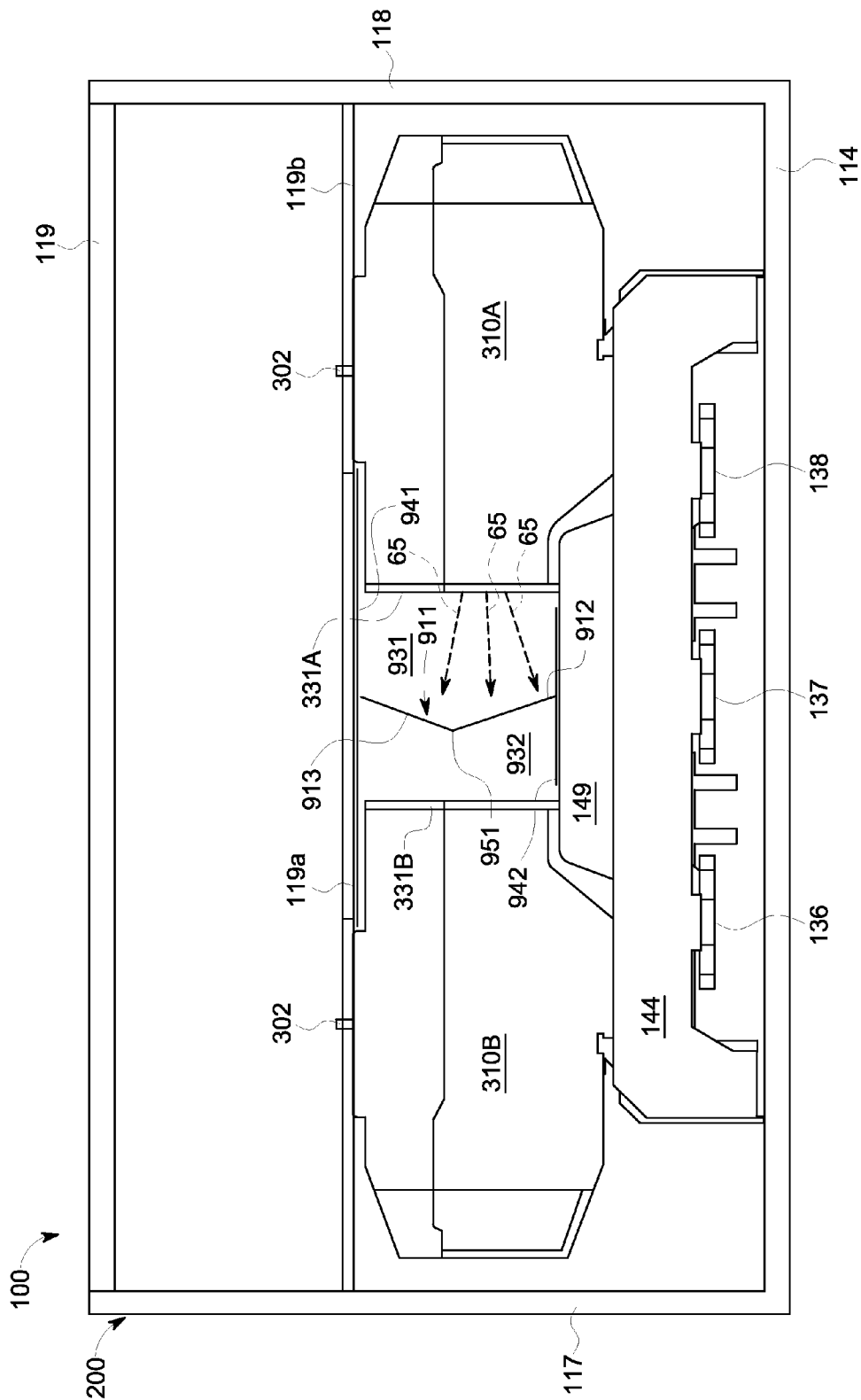
FIG. 5 is an end view the embodiment of FIG. 4 in an operative condition.

For example in an embodiment, as illustrated in FIGS. 5 and 8, the first cantilever wall member 911 includes at least one first transverse flexible member 951 such as, for example, at least one crease or fold disposed thereon. In other embodiments, the first transverse flexible member 951 may comprise a resilient member. In still other embodiments, the at least one first transverse flexible member 951 may comprise a plurality of pleats arranged to enable the inuslative barrier to function as described herein.

Referring to FIG. 5, the first transverse flexible member 951 is arranged to deflect in a first direction away from ionized gases 65 vented from at least one circuit breaker of the pair of circuit breakers 310A, 310B, and thereby allow a first deflection of the first cantilever wall member 911, in the first direction away from ionized gases 65 vented from at least one circuit breaker of the pair of circuit breakers 310A, 310B, to thereby increase the cross-sectional area of the corresponding first or second plenum portions 931, 932. Additionally, in other embodiments, the first transverse flexible member 951 is further configured to subsequently deflect in a second direction, and thereby allow a second deflection in the second direction of the first cantilever wall member 911, in response to a reduction in pressure in the corresponding first or second plenum portions 931, 932 when the vented ionized gases 65 have dissipated. In an embodiment, the second direction is opposite the first direction.

In an embodiment, the first basal end 911a of first cantilever wall member 911 is disposed proximal to the panelboard deadfront 119a, and the first distal end 911b is disposed proximal to the inulsative base 144.

For example, in an embodiment insulative barrier 900 may additionally comprise at least one of a first outer wall member 941 and a second outer wall member 942. Each of the first and second outer wall members 941, 942 are arranged substantially orthogonal to the cantilever wall member 911. In an embodiment, the first outer wall member 941 is coupled to the first basal end 911 a of cantilever wall member 911, and the second outer wall member 942 is coupled to the first distal end 911b of cantilever wall member 911. In some embodiments, the second outer wall member 942 additionally comprises retention features 935 (not shown), such as slots defined therethrough. For example, the retention features 935 (not shown) may be configured to cooperate with the divider walls 149 to locate and prevent undesired movement of the insulative barrier 900.

In other embodiments, the insulative barrier 900 may alternatively additionally be formed having a second cantilever wall member 921 defining two opposing wall face portions 922, 923 having a second basal end 921 a, and a second distal end 921b. The first and second cantilever wall members 911, 921 are arranged to overlap at least a portion of the respective distal ends 911b, 921b. In an embodiment, each of the first and second cantilever wall members 911, 921 are arranged proximate and generally opposing to the first and second circuit breaker end faces 331A, 331B and coupled in flow communication with the at least one of circuit breaker 310A, 310B exhaust vents 341A, 342A, 343A, 341B, 342B, 343B.

Figure 6:
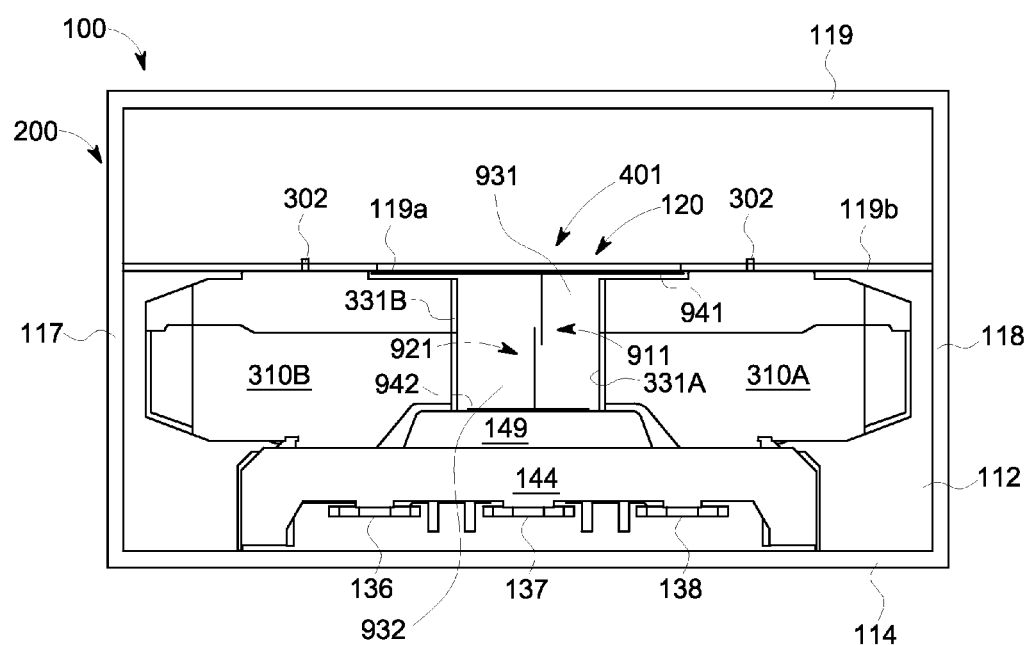
FIG. 6 is an end view of an exemplary circuit protection system according to an alternative embodiment.

For example in an embodiment, as illustrated in FIGS. 6 and 9, the first cantilever wall member 911 first wall face portion 912 is arranged opposing first circuit breaker end face 331A, and arranged in operative flow communication with corresponding exhaust vents 341A, 342A, 342A. Likewise, the second cantilever wall member 921 first wall face portion 922 is additionally arranged opposing first circuit breaker end face 331A, and in flow communication with corresponding exhaust vents 341A, 342A, 342A. Each of the first and second cantilever wall members 911, 921 are further configured to be moveable in response to an increase in pressure resulting from the presence of ionized gases 65 when vented from the circuit breaker 310A. For example, each of the first and second cantilever wall members 911, 921 may be further arranged to allow a first deflection away from the ionized gases 65, from at least one circuit breaker of the circuit breakers 310A, 310B, to thereby increase the cross-sectional area of the corresponding first or second plenum portions 931, 932. In an embodiment, the increase in the cross-sectional area of one the corresponding first or second plenum portions 931, 932 results in a decrease of the other of the first or second plenum portions 931, 932.

For example in an embodiment, each of the first and second cantilever wall members 911, 921 are arranged to cooperatively allow a first deflection in a first direction away from ionized gases 65 vented from the first circuit breaker 310A of the pair of circuit breakers 310A, 310B, thereby resulting in an increase in the cross-sectional area of the first plenum portion 931.

Additionally, in other embodiments, each of the first and second cantilever wall members 911, 921 may be further configured to subsequently cooperatively allow a second deflection in a second direction of the first cantilever wall member 911 in response to a reduction in pressure in the corresponding first or second plenum portions 931, 932 when the vented ionized gases 65 have dissipated. In an embodiment, the second direction is opposite the first direction.

In an embodiment, the first basal end 911 a of first cantilever wall member 911 is disposed proximal to the panelboard deadfront 119a, and the second basal end 921 a of second cantilever wall member 921 is disposed proximal to the insulative base.

For example, in such an embodiment the insulative barrier 900 may additionally comprise at least one of the first outer wall member 941 and the second outer wall member 942. Each of the first and second outer wall members 941, 942 may be arranged substantially orthogonal to the first and second cantilever wall members 911, 912. In an embodiment, the first outer wall member 941 is coupled to the first basal end 911a of cantilever wall member 911, and the second outer wall member 942 is coupled to the first basal end 912a of second cantilever wall member 912. In some embodiments, the second outer wall member 942 additionally comprises retention features 935 (not shown), such as slots defined therethrough. For example, the retention features 935 (not shown) may be configured to cooperate with the divider walls 149 to locate and prevent undesired movement of the insulative barrier 900.

In an exemplary embodiment, the first cantilever wall member 911 second wall face portion 913 is arranged opposing second circuit breaker end face 331B, and arranged in operative flow communication with corresponding exhaust vents 341B, 342B, 342B. Likewise, the second cantilever wall member 921 second wall face portion 923 is additionally arranged opposing second circuit breaker end face 331B, and in flow communication with corresponding exhaust vents 341B, 342B, 342B. Each of the first and second cantilever wall members 911, 921 are further configured to be moveable in response to an increase in pressure resulting from the presence of ionized gases 65 when vented from the circuit breaker 310A. Additionally, each of the first and second cantilever wall members 911, 921 are further configured to deflect in a direction away from the ionized gases 65, when vented from the circuit breaker 310A, resulting in an increase in the cross-sectional area of second plenum portion 932.

In such an embodiment, as illustrated in FIGS. 4 and 9, the first basal end 911 a of first cantilever wall member 911 is disposed proximal to the panelboard deadfront 119a, and the second basal end 912a of second cantilever wall member 912 is disposed proximal to the inulsative base 144.

For example, in an embodiment, insulative barrier 900 may additionally comprise at least one of a first outer wall member 941 and a second outer wall member 942. Each of the first and second outer wall members 941, 942 may be arranged substantially orthogonal to the cantilever wall member 911. For example, in an embodiment, the first and second outer wall members 941, 942 are arranged substantially parallel to each other. In an exemplary embodiment, the first outer wall member 941 is hingedly coupled to the first basal end 911 a of cantilever wall member 911, and the second outer wall member 942 is hingedly coupled to the second basal end 921 a of cantilever wall member 921.

In some embodiments, the second outer wall member 942 additionally comprises one or more retention features 935 (not shown), such as a plurality of slots defined therethrough. For example, the retention features 935 (not shown) may be configured to cooperate with the divider walls 149 to locate and prevent undesired movement of the insulative barrier 900.

In an embodiment, the first cantilever wall member 911 first basal end 911 a is disposed proximal to the panelboard deadfront 119a, and the second cantilever wall member 921 second basal end 921a is disposed proximal to the inulsative base 144, with the first and second distal ends 911b, 921b arranged at least partially overlapping and substantially parallel to each other. In other embodiments, insulative barrier 120 may be formed having any number of cantilever wall members and having any number of cross sectional arrangements operably disposed in the gap 410 and defining at least the first and second plenum regions 931, 932 therebetween, and that enable the insulative barrier 900 to function as described herein.

The insulative barrier 900 is configured to deflect in response to the heat and pressure of ionized exhaust gases vented into one of the first and second plenum regions 931, 932 to thereby enlarge the size of one of the plenum regions 931, 932, and in some embodiments, to simultaneously reduce the size of the other plenum region 931, 932. Ionized exhaust gases 65 gases are thereby directed away from both electrically energized and grounded conductive parts in the panelboard 101. Once vented into the one of the first and second plenum regions 931, 932, the exhaust gases 65 circulate within the respective plenum region 931, 932, and are directed along one of the third and fourth longitudinal axes X3, X4, moving away from the high pressure and towards low pressure portions of the affected plenum region 931, 932. Contact by ionized exhaust gases 65 with an energized or grounded conductor is thereby prevented.

In some embodiments, the insulative barrier 900 may be fabricated using a suitable electrically insulative material such as a flame retardant flexible polypropylene sheet. In other embodiments, the insulative barrier 900 may be fabricated using a suitable ablative insulative material.

In an embodiment, the insulative barrier 900 may advantageously be formed from a unitary sheet of suitable material. For example, such a unitary sheet may be folded or otherwise bent to arrange the insulative barrier 900. To facilitate forming the barrier 900 from a unitary sheet, the sheet may have creases or perforations formed thereon to guide a folding of the sheet to form the barrier 900.

In still other embodiments, a plurality of insulative sheets may be used to form the insulative barrier 900, having any number of configurations that enable the insulative barrier to function as described herein.

In some embodiments, one or more retention features (not shown) such as slots are provided on insulative barrier 900. For example, the retention features may be configured to cooperate with the divider walls 149 to prevent undesired movement of the insulative barrier 120. In yet other embodiments, as shown in FIG. 5, the panelboard deadfront 119a may be operatively arranged to provide a retention force on insulative barrier 900 to further retain the insulative barrier 900 in the operative position in gap 401.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical switching apparatus for housing a pair of opposing circuit breakers each circuit breaker of the pair of opposing circuit breakers having an opposing end face including an exhaust vent disposed thereon, the electrical switching apparatus comprising:
    a panelboard configured to operatively support the pair of opposing circuit breakers to define a gap therebetween;
    an insulative barrier configured to be operatively disposed in the gap, comprising a first cantilever wall member arrangeable to define a first plenum region having a first cross sectional area, and a second plenum region having a second cross sectional area; and
    the insulative barrier operative to deflect in a first direction to thereby increase one of the first and second cross sectional areas in response to a venting of ionized gases from one circuit breaker of the pair of circuit breakers.

2. The apparatus of claim 1, wherein the insulative barrier is further operative to simultaneously decrease the other one of the first and second cross sectional areas in response to the venting of ionized gases from one circuit breaker of the pair of circuit breakers.

3. The apparatus of claim 1 wherein the insulative barrier further comprises retention features configured to retain the insulative barrier in the operative position in the gap.

4. The apparatus of claim 1 wherein the insulative barrier further comprises a first outer wall member and a second outer wall member; and wherein the cantilever wall member is coupled to and disposed substantially orthogonally between said first and second outer wall members.

5. The apparatus of claim 1 wherein the cantilever wall member further comprises a first transverse flexible member arranged deflect in the first direction in response to a venting of ionized gases from one circuit breaker of the pair of circuit breakers.

6. The apparatus of claim 5, wherein the transverse flexible member is one of a pleat, a crease, or a resilient member.

7. The apparatus of claim 5, wherein the first transverse flexible member is further configured to subsequently allow a second deflection in a second direction of the first cantilever wall member.

8. The apparatus of claim 7, wherein the second direction is opposite the first direction.

9. The apparatus of claim 1 wherein the insulative barrier further comprises a second cantilever wall member cooperative with the first cantilever wall member to define the first plenum region and second plenum regions.

10. The apparatus of claim 9, wherein the first and second cantilever wall members are each configured to cooperatively deflect in a first direction to thereby increase one of the first and second cross sectional areas in response to the venting of ionized gases from one circuit breaker of the pair of circuit breakers.

11. The apparatus of claim 10, wherein the first and second cantilever wall members further each configured to subsequently cooperatively deflect in a second direction 12. The apparatus of claim 11, wherein the second direction is opposite the first direction.

13. The apparatus of claim 9 wherein first and second cantilever wall members comprise a respective first and second a second basal end, and a respective first and second distal end; and whererin the first and second cantilever wall members are arranged to overlap at least a portion of the respective distal ends.

14. The apparatus of claim 9, wherein each of the first and second cantilever wall members are configured to be operatively arranged generally opposing a respective one of the pair of circuit breaker end faces, and coupled in flow communication with the respective exhaust vent thereon.

15. The apparatus of claim 9, wherein the insulative barrier further comprises a first outer wall member and a second outer wall member; and wherein the first cantilever wall member basal end is coupled to the first outer wall member, and the second cantilever wall member basal end is coupled the second outer wall member.

16. An electrical protection system including a pair of circuit breakers, comprising:

an enclosure for housing the pair of circuit breakers;

the enclosure being configured to operatively support the pair of circuit breakers to define a gap therebetween;

an insulative barrier configured to be operatively disposed in the gap, comprising a first cantilever wall member arrangeable to define a first plenum region having a first cross sectional area, and a second plenum region having a second cross sectional area; and the insulative barrier operative to deflect in a first direction to thereby increase one of the first and second cross sectional areas in response to a venting of ionized gases from one circuit breaker of the pair of circuit breakers.

17. The electrical protection system of claim 16, wherein the insulative barrier is further operative to simultaneously decrease the other one of the first and second cross sectional areas in response to the venting of ionized gases from one circuit breaker of the pair of circuit breakers.

18. The electrical protection system of claim 17, wherein the insulative barrier further comprises a second cantilever wall member cooperative with the first cantilever wall member to define the first plenum region and second plenum regions.

19. The electrical protection system of claim 18 wherein the first and second cantilever wall members are each configured to cooperatively deflect in a first direction to thereby increase one of the first and second cross sectional areas in response to the venting of ionized gases from one circuit breaker of the pair of circuit breakers.

20. The electrical protection system of claim 19 wherein the first and second cantilever wall members further each configured to subsequently cooperatively deflect in a second direction.

* * * * *